Oct. 26, 1926. Re. 16,444

M. A. FESLER

SAFETY DEVICE FOR BURNERS

Original Filed June 19, 1925 2 Sheets-Sheet 1

Inventor
Milton A. Fesler
Hood & Hahn
Attorneys

Oct. 26, 1926. Re. 16,444

M. A. FESLER

SAFETY DEVICE FOR BURNERS

Original Filed June 19, 1925 2 Sheets-Sheet 2

Inventor

Milton A. Fesler

By

Hood & Hahn

Attorneys

Reissued Oct. 26, 1926.

Re. 16,444

UNITED STATES PATENT OFFICE.

MILTON A. FESLER, OF STAMFORD, CONNECTICUT, ASSIGNOR, BY MESNE ASSIGNMENTS, TO COMBUSTION-CONTROL CORPORATION, OF BOSTON, MASSACHUSETTS, A CORPORATION OF DELAWARE.

SAFETY DEVICE FOR BURNERS.

Original No. 1,574,728, dated February 23, 1926, Serial No. 38,278, filed June 19, 1925. Application for reissue filed July 12, 1926. Serial No. 122,009.

This invention relates to a safety control thermostat for burners for stopping the supply of fuel upon failure of the fuel to ignite.

In the use of oil burners in furnaces it is extremely important that means be provided for automatically cutting off the supply of fuel to the burner in case the fuel discharged from the burner is not ignited, for if the fuel is not consumed as it is delivered by the burner it will accumulate in or about the furnace in a highly inflammable condition.

It has been proposed heretofore to use a thermostat for cutting off the supply of fuel to a burner upon failure of the fuel to ignite, but difficulty has been experienced in developing a thermostat control that will operate promptly, due to the fact that if the thermostat is placed sufficiently close to the burner to operate promptly when the burner is started it is likely to be injured by the heat of the furnace when the latter has reached its normal operating temperature, and if the thermostat is located in the furnace stack, or in some position remote from the burner, it will not operate promptly.

One important feature of the invention therefore resides in a safety control thermostat that is located near the burner where it will be quickly heated, and in the construction for preventing the thermostat from becoming overheated.

Another feature of the invention resides in the construction for stopping the supply of fuel to the burner upon failure of the fuel issuing from the burner to ignite.

Other features of the invention and novel combination of parts in addition to the above will be hereinafter described in connection with the accompanying drawings which illustrate one good practical form of the invention.

Figure 1:
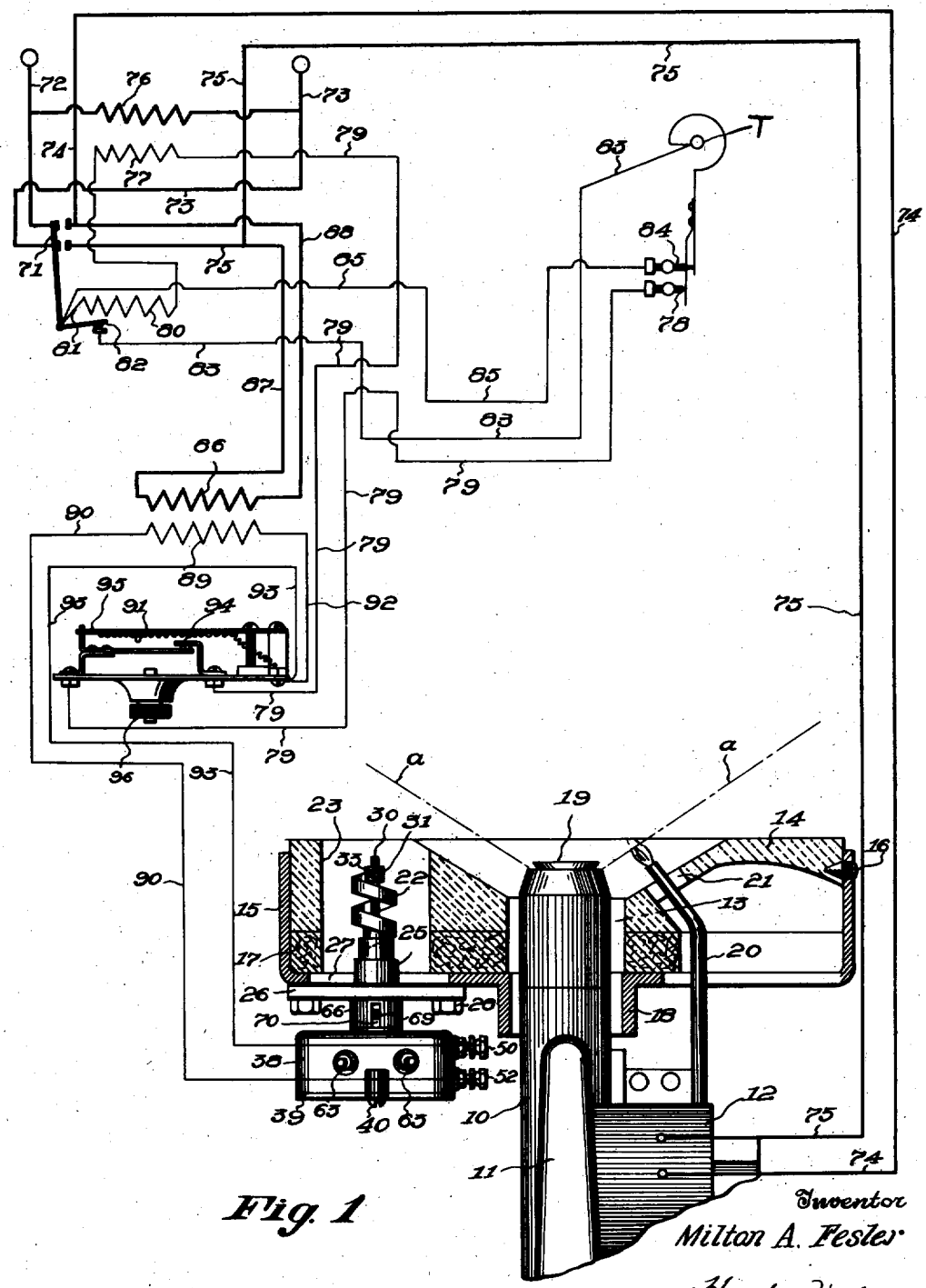

In the drawings, Fig. 1 is a horizontal, sectional view through the front portion of a furnace showing the burner in its operative position and showing the electrical connections diagrammatically.

Figure 2:
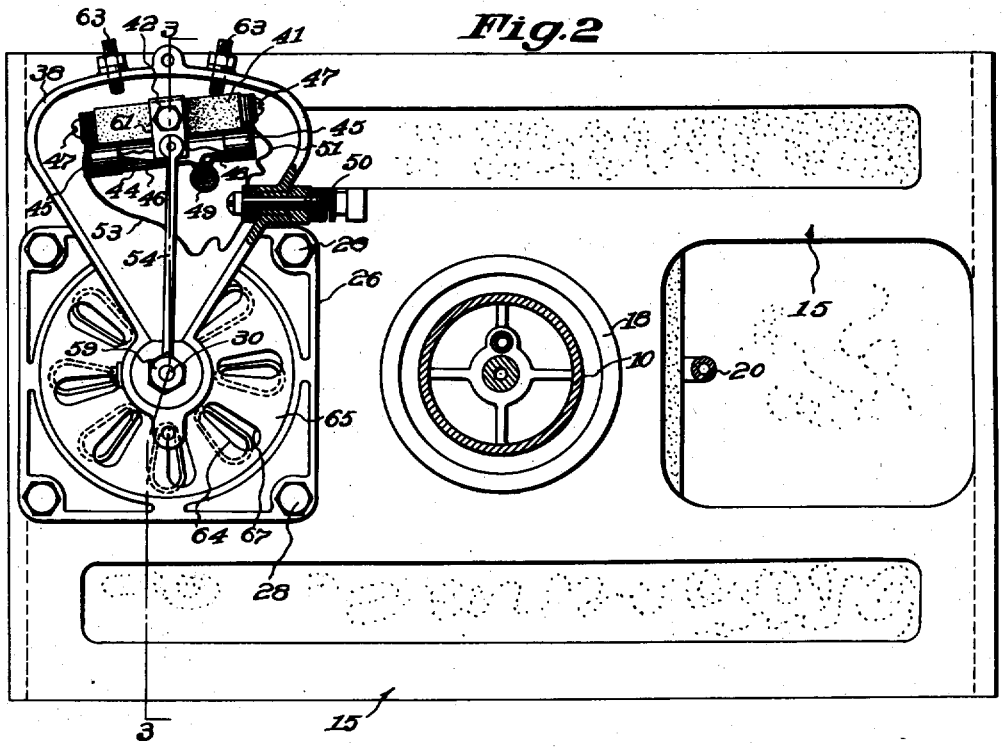
Figure 3:
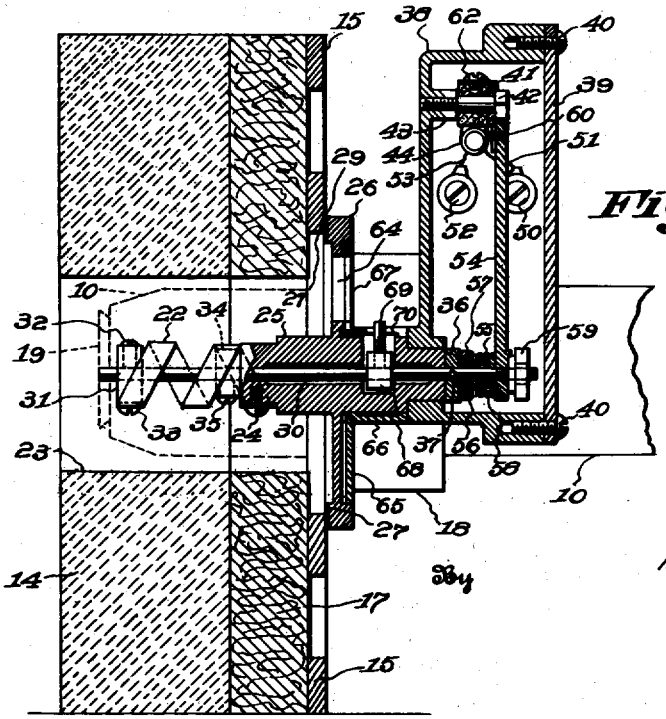

Fig. 2 is a front elevation of the parts shown in Fig. 1, the burner being cut by a vertical transverse section and the cover plate of the switch being removed; and Fig. 3 is a vertical sectional view taken on line 3—3 of Fig. 2.

The safety control thermostat of the present invention may be used in connection with either domestic or commercial furnaces, but it is particularly well adapted for use in domestic furnaces of the intermittent firing type such as are controlled by automatic means which frequently stop and start the burner.

In the embodiment of the invention illustrated, it is assumed that the burner 10 is of the type that employs a blast of air to atomize the oil, and air is supplied to the burner by a fan which is driven by the electric motor 12. It is further assumed that the motor 12 drives an oil pump or operates in some other manner to control the supply of fuel to the burner, so that the starting of the motor 12 will cause the burner to deliver atomized oil to the furnace ready for combustion, and stopping the motor will stop the supply of fuel to the burner.

The discharge end of the burner 10 is shown as projecting into a furnace through an opening 13 formed in the refractory material 14 which is mounted within the metal frame 15. The material 14 may be secured within the frame 15 by the set screw 16, and air cell insulating material 17 may be provided between the inner face of the frame 15 and the refractory material 14. The frame 15 is provided with a frontwardly extending annular flange 18 that surrounds the burner 10, and an atomizer 19 at the discharge end of the burner serves to direct the atomized fuel outwardly, as indicated by the lines *a*.

A gas or other form of pilot is provided to ignite the fuel as it is discharged from the burner, and the pilot is shown as comprising the gas pipe 20, the inner end of which extends inwardly through an opening 21 in the refractory material.

As stated, an important feature of the present invention resides in a safety control thermostat which is located sufficiently close to the burner to be quickly heated thereby, and which is protected from the intense heat of the burner. In the construction shown a thermostatic element 22 is mounted in an opening 23 formed in the refractory material 14 at one side of the burner where it will be subjected to the reflex heat from the burner jet. The thermostatic element 22 might be variously constructed, and as shown comprises a coil formed of different metals which expand unequally under temperature changes, and one end of this coil is rigidly secured by a screw 24 to a hub 25 which hub is provided with a flange plate 26 that is secured over an opening 27 in the frame 15 and is fastened to the frame by bolts 28. Suitable packing 29 is preferably provided between the front face of the casing 15 and the inner face of the flange plate 26.

Since the thermostatic element 22 is mounted within a relatively deep hole in the furnace wall, it is well protected from the destructive action of the high temperature of the burner, while at the same time it is in position to be quickly heated by the burner. The hole 23 forms a passage through which currents of air may enter the furnace about the thermostatic element to reduce its temperature and these currents of air are automatically controlled by the expansion and contraction of the element 22 as will presently appear. When air is permitted to flow into the furnace through the hole 23 it will not only cool the thermostatic element 22, but it will also drive back the heat of the burner to prevent it from entering the opening 23, thus effectually protecting the thermostatic element from the high temperature of the furnace.

Within the hub 25 is rotatably mounted the shaft 30, the inner end of which extends inwardly through the coiled thermostatic element 22, and the collar 31 is rigidly secured to the inner end of the shaft in the desired position of adjustment by a set screw 32, while the inner end of the coiled strip 22 is secured to this collar by a screw 33. A bearing sleeve 34 rigidly secured to the shaft 30 by a screw 35 forms a stop to prevent the shaft from moving in the hub in a right hand direction, viewing Fig. 3, and a collar 36 which is secured to the shaft 30 by a pin 37 abuts against the opposite end of the hub 25 and prevents the shaft from moving therein in a left hand direction. The construction of the thermostatic coil 22 is such that as the temperature of the same increases it will expand to rotate the shaft 30 in a clockwise direction, and as its temperature decreases it will contract and rotate the shaft in a contra-clockwise direction.

Rotation of the shaft 30 by the thermostatic element 22 serves to open and close an electric switch. Various means to this end might be provided, and in the construction shown the electric switch and means for operating the same are mounted in the casing 38 which is rigidly secured to the hub 25 and the front face of the casing 38 is closed by the plate 39 which may be secured to the casing by screws 40.

The casing 38, as shown, extends upwardly from the supporting hub 25 and flares outwardly in an upward direction to provide sufficient room in the upper portion of the casing to accommodate the switch to be described. In the construction shown a mercury switch is pivotally supported by the bolt 42, the inner end of which is screwed into a plug 43 extending inwardly from the inner face of the casing. The mercury switch may comprise a glass tube 44 the opposite ends of which are received in cup-shaped supporting elements 45 which are secured to the opposite ends of the block 41, and a conductor wire or the like 46 extends from screw 47 at one end of the block into one end of the tube 44, while a second conductor wire 48 dips into a mercury cup 49 formed at the lower wall of tube 44, and this conductor 48 is connected to the other contact screw 47. The construction of the mercury switch is such that when it is tilted about its pivot 41 to the position shown in Fig. 2 the mercury will flow towards one end of the tube away from the mercury which is imprisoned in the cup portion 49, thus breaking the circuit, and when the tube is tilted in the opposite direction, the mercury at the left hand end thereof will flow along the bottom of the tube to close the circuit.

The contact screw 47 at the right hand end of the tube is connected to a terminal screw 50 by the wire 51 and the contact screw 47 at the left hand end of the tube is connected to a second terminal screw 52 by the wire 53.

In the construction rocking movement is imparted to the mercury switch from the shaft 30 by an operating arm 54. It is desirable that the arm 54 be frictionally secured to the shaft 30 so that the swinging movement imparted to the arm 54 may be restricted without restricting the turning movement of the shaft 30, and to this end the arm 54 is provided with a hub 55 which rotatably receives the shaft 30 and this hub is provided with pins 56 which project slidably into holes formed in a collar 57 rotatably mounted on the shaft 30, the inner face of which collar rests against the sleeve 36 which is rigidly secured to the shaft.

A coiled spring 58 confined between the sleeve 57 and a face of the lever 54 serves to hold the sleeve 57 in frictional engagement with the collar 36 and the friction between these elements may be varied as desired by adjusting the nut 59 which retains the arm 54 in place upon the operating shaft.

The upper end of the arm 54 is provided with a laterally extending pin 60 which engages a slot formed in the downwardly extending portion of the metal strip 61 that is secured to the block 41 by the screw 62, the arrangement being such that as the arm 54 rocks it will rock the block 41 and mercury switch about the shaft 42. The rocking movement imparted to the mercury switch may be limited by adjusting the stop screws 63 adjustably mounted in the upper wall of the casing 38.

It will be noted that the lever arm 54 is very much longer than the lever arm 61 and that therefore a very small angular movement of the shaft 30 will produce the angular movement of block 41 to open or close the circuit controlled by the mercury switch. This is important, as will be made to appear.

Since the thermostatic element 22 is located near the burner where it will be quickly heated, it is necessary to provide means to prevent the same from being injured by the high temperature of the burner and this is accomplished, in accordance with the present invention, by providing means for regulating the flow of cooling currents of air into the furnace about the thermostatic element. Various means to this end might be provided, and, in the construction shown, it is accomplished by forming a number of holes 64 in the flange plate 26 for the passage of air into the furnace through the hole 23 to cool off the thermostatic element 22. It is desirable that this cooling air shall pass through the opening 23 only when the thermostatic element is heated and that the openings 64 be closed when the burner is inactive so that the element 22 will be quickly heated as soon as the burner is started.

To this end the flange plate 26 is provided with a shutter or cover 65 comprising a disk which is provided with the annular flange portion 66 that is journalled on the fixed hub 25. The shutter 65 is provided with the openings 67 positioned to be aligned with the openings 64 upon turning the shutter, and in order that the shuter 65 may be rotated by the shaft 30 a collar 68 mounted upon this shaft is rigidly secured thereto by a bolt 69, the outer end of which extends through a slot 70 formed in the annular flange 66 to rotate with the shutter.

As a result of the construction just described, the element 22 upon becoming heated will turn the shutter 65 to admit air through the aligned openings 64 and 67 so that air will be drawn into the furnace through these openings to cool off the element 22, and the movement of the shutter will be in proportion to the expansion of the element 22 under different temperature. It will therefore be seen that relatively slight changes in the temperature of the thermostatic element will move the shutter to vary the amount of cooling air admitted to the element 22 and this will tend to keep the thermostatic element at a temperature much below the high temperature of the furnace. When the fire goes out, the air entering the furnace about the element 22 will quickly cool this element, whereupon it will rotate the shutter 65 to the closed position to remain in this position until the furnace is again heated. This is desirable because if the shutter is closed when the burner is lighted the thermostatic element will be quickly heated sufficiently to operate the electric switch.

It will be noted that, because of the difference in lengths of the lever arms 54 and 61, the mercury switch will be quickly shifted at the beginning of the return movement of the shaft 30 due to cooling resulting from absence of fire and that this movement will take place before there is any great return movement of the shutter. That is to say; the opening 23 is kept open long after the switch has been shifted to cause a stoppage of fuel delivery so that the thermostatic element cannot be reheated to throw the switch to operative position as a result of heat retained in the furnace after there has been a failure of combustion.

The mercury switch above described which is controlled by the thermostatic element 22 may be employed in various ways to stop the supply of fuel to the burner when the atomized fuel discharged by the burner is not ignited by the pilot or in case the fire goes out. One desirable form of wiring circuit to the end is shown in Fig. 1, wherein it is assumed that T designates a thermometer controlled switch of well known construction and which is adapted to be mounted in a room of a house to start the oil burner when the temperature of the room falls below a predetermined point, and to stop the burner when the temperature of the room rises above this point. The motor 12 which controls the operation of the burner may be operated from the usual electric light circuit of a house using alternating current, and the operation of the motor 12 is controlled by the switch 71 which is connected to one conductor of the usual electric light system by the wire 72 and is connected to the other conductor of the electric light system by the wire 73. The switch 71 is shown as in its open position and is adapted to be moved in the right hand direction to close the switch and start the motor whereby the wire 72 will be connected to the wire 74 leading to one terminal of the motor and the wire 73 will be connected to the wire 75 leading to the other terminal of the motor.

In order that the switch T may be sufficiently sensitive to maintain the temperature of a room at substantially a constant temperature and may make and break the circuit without sparking, it is desirable that the current supplied to this switch be of much lower voltage than that commonly employed in the ordinary electric light circuit. The switch T is therefore not directly connected to the electric light circuit, but is connected to a secondary circuit supplied with current produced by the transformer consisting of the primary coil 76 and the secondary coil 77. The primary coil 76 is connected across the current supply wires 72 and 73. One terminal of the secondary coil 77 is connected to the contact pin 78 of the switch T by the wire 79, and the opposite terminal of the secondary coil 77 is connected to the switch closing coil 80. The opposite terminal of the coil 80 is connected by the conductor 81 to the switch 82 which serves to complete the circuit between the coil 80 and the wire 83 when the main switch 71 is moved to the motor operating position. The wire 83 leads to one terminal of the switch T.

The switch T, which, as stated, is of well known construction, is commonly provided with a second contact pin 84 which cooperates with the contact pin 78 to prevent oscillation or repeated flashing on and off of the circuit when the same is being made or broken. This contact pin 84 is connected to the contuctor 81 of the holding coil 80 by the wire 85, the arrangement being such that the current from the secondary coil 77 will not pass through the holding coil 80 to close the main switch until both contacts 78 and 84 engage their cooperating elements, whereupon the switch 82 is closed to insure the main switch being held in its closed position until the temperature of the thermometer switch T has dropped sufficiently to open the circuit of the contacts 78 and 84.

From the wiring circuit so far described it will be seen that the temperature controlled switch T serves to open and close the switch 71 to start and stop the burner, but, as above pointed out, it is important that means be provided for promptly cutting off the supply of fuel to the burner 10 in case the fuel discharged therefrom is not ignited by the pilot 20. To this end is provided a delay switch which is arranged to stop motor 12 at the end of a short interval of time, say forty seconds, if the thermostatic element 22 is not heated during that short period of time by the burner to actuate the mercury switch 44.

This is accomplished in the wiring arrangement shown in Fig. 1 by a second transformer having a primary coil 86, one terminal of which is connected to the motor operating wire 75 by the wire 87 and the other terminal of which is connected to the motor operating wire 74 by the wire 88. Associated with the primary coil 86 is the secondary coil 89, one terminal of which is connected to the contact bolt 52 of the mercury switch by the wire 90, and the other terminal of which is connected to a delay heating coil 91 by the wire 92. The opposite terminal of this delay heating coil is connected to a wire 93 leading to the contact bolt 50 of the mercury switch. Associated with the delay heating coil 91 is a switch 94 which is normally closed, and which is included in the circuit 79 above mentioned so that if this switch is opened it will immediately cut off the supply of current to the holding coil 80 and cause the main switch 71 to open and stop the motor 12.

The mercury switch 44, as above stated, is closed when the thermostatic element 22 is not heated, so that as soon as the main switch 71 is closed to start the motor 12, current is supplied to the delay heating coil 91 and the same gradually heats a strip of thermostatic metal 95 which, at the end of a short period of time, say forty seconds, will flex in a direction to open the switch 94, should the mercury switch 44 fail to be opened and cut off the current to the heating element 91 prior to this occurrence.

From the foregoing it will be understood that the thermostatic element 22 is positioned near the burner where it will be quickly heated upon starting the burner so that it will act promptly to open the mercury switch to prevent the motor from being stopped by the delay heating element 91, and it will also be understood that as the temperature of the element 22 increases it will open the shutter to admit cooling currents of air. Should, for any reason, the fuel discharged by the burner 10 fail to be ignited by the pilot, then the thermostatic element 22 will not be heated to open the mercury switch, and at the end of a short period of time, say forty seconds, the delay heating element 94 will effect the opening of the switch 91 to stop the motor. The switch 94 will not operate unless the fuel discharged by the burner fails to ignite, and when once open, it will remain open until the parts have cooled off and the same is manually closed by the reset button 96, after the burner defect has been corrected.

Since the operating arm 54 is frictionally secured to the shaft 30 and moves through only a short distance to actuate the mercury switch, a slight movement of the shaft 30 in either direction will serve to throw the switch, while the friction connection between the shaft and arm will permit a further movement to be imparted to the shaft to actuate the shutter.

What is claimed is:—

1. In combination with a burner, a safety control thermostat, comprising in combination, a thermostatic element mounted near the burner to be quickly heated thereby, means controlled by said element for cutting off the supply of fuel to the burner, a shaft rotatably supported adjacent said element and mechanically connected to the free end of the element to be rotated by its contraction and expansion, means controlled by the thermostatic element for cutting off the supply of fuel to the burner, and means actuated by the turning of said shaft to control the flow of cooling currents of air to the thermostatic element for preventing its overheating.

2. In combination with a furnace burner, a thermostatic element mounted near the burner to be quickly heated thereby, a shaft mounted to be rotated by the expansion and contraction of said element, an electric switch operable by the movement of said shaft and adapted to control the supply of fuel to the burner, and a shutter mounted to be opened and closed by the movement of said shaft and adapted to control the supply of fuel to the burner, and a shutter mounted to be opened and closed by the movement of said shaft to admit cooling air to the element.

3. In combination with a burner, a safety control thermostat mounted sufficiently close to the burner to be quickly heated thereby and comprising a thermostatic element of spiral shape and having one end anchored in a fixed position while its other end is free to rotate under temperature changes, a shutter for controlling the flow of air about the thermostatic element to cool the same and connected to the free end of the thermostatic element to be rotated to the open position as the temperature of the thermostatic element increases and to the closed position as the temperature drops, and means controlled by said element to cut off the supply of fuel to the burner when the fuel fails to ignite.

4. In combination with a burner, a safety control thermostat, comprising in combination a thermostatic element mounted in position to be heated by the burner and provided with a thick protecting wall or housing that surrounds the element and forms an air passage through which air may enter the furnace about the element, said wall or housing being constructed to extend inwardly toward the interior of the furnace a sufficient distance to exclude from the thermostatic element practically all heat rays except those that enter the inner end of the air passage, means associated with the burner operating mechanism and controlled by the thermostatic element to be actuated upon failure of the fuel to ignite, and means controlled by the thermostatic element to regulate the flow of air into the furnace through said passage to cool the element.

5. In combination with a furnace, a burner for the furnace, a thermostatic element mounted in an opening in a wall of the furnace in position to be quickly heated, a shaft adapted to be rotated by changes in the temperature of said element, a hub for rotatably supporting said shaft, means for supporting the hub at said opening in spaced relation to the walls thereof, means actuated by the rotation of said shaft to control the passing of cooling currents of air through the opening about the thermostatic element, and means actuated by the rotation of said shaft for shutting off the supply of fuel to the burner when the fuel fails to ignite.

6. In combination with a furnace, a burner for the furnace, a thermostatic element supported in position to be heated quickly by the burner, a shaft adapted to be rotated by changes in the temperature of said element, means actuated by the shaft for controlling the passage of cooling currents of air to said element to prevent it from overheating, a switch actuated by said shaft, and electric means controlled by said switch for cutting off the supply of fuel to the burner upon the failure of the fuel to ignite.

7. In combination with a burner, a safety control thermostat, a thermostatic element mounted near the burner in position to be quickly heated and arranged to be cooled by currents of air entering the furnace, means controlled by said element to cut off the supply of fuel to the burner when the fuel fails to ignite, and a shutter for controlling the flow of cooling currents of air past the thermostatic element and mechanically connected to the element so that it is opened different amounts in proportion to the expansion and contraction of the element to vary the volume of air throughout a substantial range.

8. In combination with a burner, a safety control thermostat, comprising in combination, a thermostatic element mounted near the burner in position to be quickly heated and provided with a surrounding wall forming an air passage leading into the furnace, means controlled by said element to cut off the supply of fuel to the burner when the fuel fails to ignite, and a shutter for controlling the flow of cooling currents of air into the furnace through said passage and mechanically connected to the thermostatic element so that it is opened different amounts in proportion to the temperature changes to increase the air volume in proportion to the increase in the temperature in said element.

9. In combination with a burner, a safety control thermostat, comprising in combination, a thermostatic element mounted in position to be heated by the burner and arranged to be cooled by currents of air entering the furnace, means controlled by said element to cut off the supply of fuel to the burner when the fuel fails to ignite, and adjustable means for controlling the flow of cooling currents of air past the thermostatic element and mechanically connected to the element so that it is opened different amounts in proportion to the expansion and contraction of the thermostatic element to vary the volume of air throughout a substantial range.

10. In combination with a burner, a safety control thermostat, comprising in combination a thermostatic element mounted in position to be heated by the burner and provided with a protecting wall that surrounds the element in spaced relation thereto to form an air passage leading into the furnace, said wall being constructed to form a housing about the element that extends toward the interior of the furnace beyond the element to exclude practically all heat rays from the thermostatic element except those that enter the inner end of said passage, means controlled by the thermostatic element to cut off the supply of fuel to the burner when the fuel fails to ignite, and mechanically controlled means actuated by the thermostatic element to regulate the flow of air through said passage about the element.

11. In combination with a furnace having a thick wall of refractory material, a burner having its discharge end projecting into the furnace through said wall, a thermostatic element mounted near the burner to be heated thereby and positioned in a passage formed through the thick furnace wall and in spaced relation to the walls of the passage to be cooled by air currents entering the furnace through said passage, the walls of the passage being formed to project toward the interior of the furnace beyond the thermostatic element to protect it from practically all heat rays except those that enter the inner end of the passage, means controlled by the thermostatic element to cut off the supply of fuel to the burner when the fuel fails to ignite, and adjustable means for controlling the flow of cooling current of air through the passage about said element and controlled by the expansion and contraction of said element.

12. In combination with a burner, a safety control thermostat, comprising in combination, a thermostatic element mounted near the burner and positioned in a passage formed in a wall of the furnace so that it is protected by the walls of the passage from all heat rays except those that enter the inner end of the passage and is subject to the cooling action of air currents entering the furnace through said passage, means controlled by said element for cutting off the supply of fuel to the burner, and a closure for the outer end of said passage and adjustable to one position to cut off the flow of air therethrough that said element may be quickly heated and adjustable to a second position to permit air to pass through the passage and drive back the heat, and mechanical means controlled by the expansion and contraction of said element to actuate the closure.

13. In combination with a furnace having a burner, a safety control thermostat, comprising in combination, a thermostatic element mounted in an opening formed in a wall of the furnace near the burner so that it is cooled by air passing into the furnace through the opening, said opening being constructed so that its surrounding walls enclose and protect the thermostatic element from practically all heat rays except those that enter the inner end of the opening and cause the air currents passing through the opening to drive the heat of the burner back away from the mouth of the opening, means controlled by the thermostatic element to cut off the supply of fuel to the burner when the fuel fails to ignite, and mechanically controlled means actuated by the thermostatic element to control the flow of air through said opening about said element.

14. A heating unit comprising a fuel burner, a fuel director by means of which flow of fuel to the burner may be maintained or discontinued, a thermostat arranged to be responsive to conditions in the combustion zone of the burner, a circuit switch actuated by said thermostat, an electric circuit comprising said circuit switch and means for controlling the fuel director, and means actuated by the thermostat by which the thermostat may be protected from the heat of combustion subsequent to a shifting of the switch in one direction and the protection maintained until after the switch has been reversed by cooling of the thermostat.

15. A heating unit comprising a fuel burner, a fuel director by means of which flow of fuel to the burner may be maintained or discontinued, a thermostat arranged within the direct influence of a combustion zone of the burner, a circuit switch actuated by said thermostat, an electric circuit comprising said circuit switch and means for controlling the fuel director, and means by which a cooling current of air may be directed upon said thermostat, said means comprising a shutter controlled by the thermostat and opened subsequent to the actuation of the switch due to combustion zone heat and closed subsequent to actuation of the switch due to lack of combustion zone heat.

16. A heating unit comprising a fuel burner, a fuel director by means of which flow of fuel to the burner may be maintained or discontinued, a controller for said director, a thermostat arranged within the direct influence of the combustion zone of the burner and comprising a movable element, a member actuated by said movable element and connected to the controller to fully shift it upon initial movement of the movable element of the thermostat in either direction, a shutter arranged to control flow of cooling currents of air adjacent the thermostat, and a connection between said shutter and the movable element of the thermostat.

MILTON A. FESLER.